Sept. 29, 1942.     J. A. WISE     2,297,379
ANIMAL OPERATED STOCK-WATERING TROUGH
Filed Sept. 7, 1941

Inventor
John Ambrose Wise,
by
W. S. Miller

Attorney.

Patented Sept. 29, 1942

2,297,379

UNITED STATES PATENT OFFICE 2,297,379

ANIMAL OPERATED STOCK-WATERING TROUGH

John Ambrose Wise, Rockyford, Alberta, Canada

Application October 7, 1941, Serial No. 413,913

2 Claims. (Cl. 119—75)

This invention relates to an improved type of stock watering trough into which by semi-automatic means a supply of drinking water controllably flows from a reservoir or portable tank, such means being actuated by the animal itself when in its natural drinking position, the device being disposed to accommodate hogs who would naturally use the snout in such action as also to accommodate calves who would just as naturally attack such a device by using the forehead to operate same.

My improvement is a labor saving means for watering the stock, having for its objects the provision of a drinking trough which serves the dual purpose of watering at least two species of animals, such as hogs and calves without waste of water, and without any possibility of such animals wallowing about the device. The apparatus consists of a hygienic, compact, and durable drinking trough which is chambered within the confines of the water supply tank to avoid possibility of freezing, since the temperature of the water in stock supply tanks for drinking is usually artificially raised above freezing point. It also provides for a valve without any spring or springs, an advantage that must be considered when needle ice, grit, or corrosion may readily affect proper functioning in the case of a closed in spring.

The manner of approach to the drinking device by the different species of animals mentioned especially has been carefully studied, and in order to accommodate these animals in their specific ways of drinking the shape and size of the operational members of the device have been accordingly substantially varied.

The principle adopted in my improved invention is that hydrostatic pressure together with a counterbalance weight closes a valve, which pressure and weight are counteracted by the reversed movement of the stem of the valve due to the applied pressure of the animal's head or nose as the case may be, and as soon as that action ceases such hydrostatic and weight pressure closes the valve, and the selected operating flap, herein described, is left ready for the next attack of the animal wanting to drink.

My invented valve stem is designed to effectively maintain proper axial travel within a stem guiding pipe nipple. The device differs from conventional animal operated types of drinking troughs in that it is placed wholly within the supply tank, resulting in perfect cleanliness. One drinking unit only is necessary in place of an exterior unit accessory to the supply tank as in the case of other types. Fouling of the drinking water will not take place on account of the fact that the device is well protected and shielded within the supply tank.

I attain these objects and advantages by the device illustrated in the drawing and described in the following specification in which drawing—

Similar numerals refer to similar parts throughout the several views.

Figure 1:
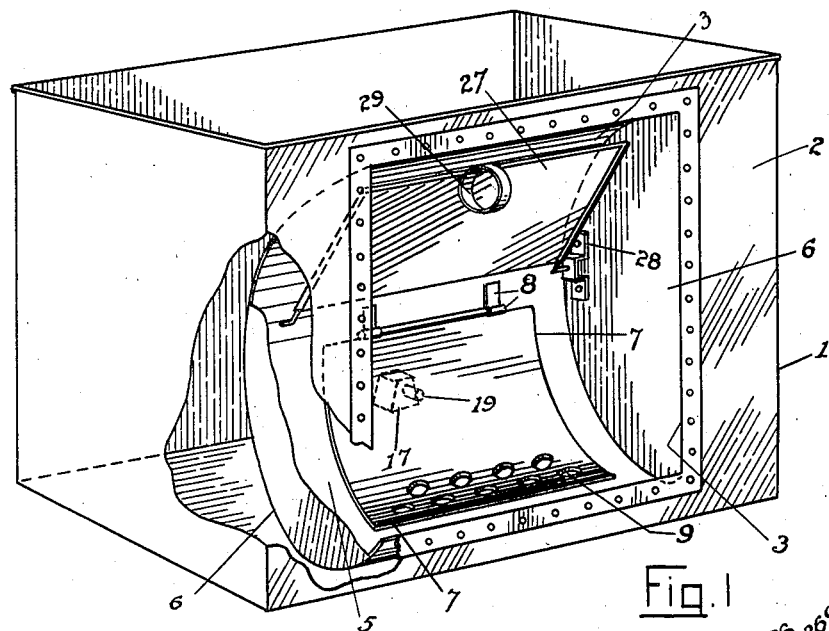
Fig. 1 shows a fragmental perspective view of the device.
Figure 2:
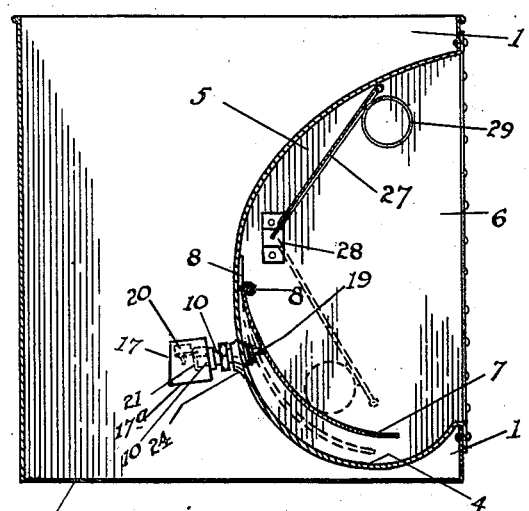
Fig. 2 is a vertical cross sectional view.
Figure 3:
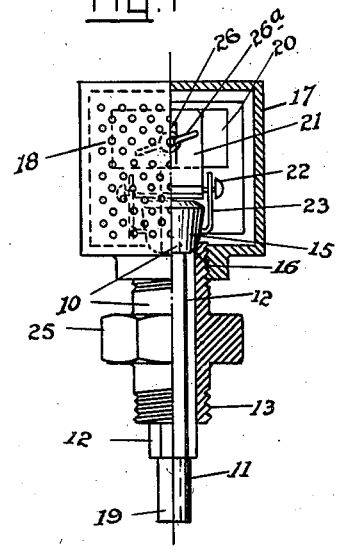
Fig. 3 is an enlarged detail of the counterweighted valve and enclosing strainer.
Figure 4:
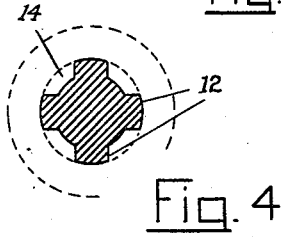
Fig. 4 is a cross section of the valve stem through the ribs.

My invented device includes a water tank 1, the preferred type being rectangular as illustrated in Fig. 1. The front wall 2 of this tank is cut away to form a rectangular opening 3 into which opening is placed a trough for drinking from and the operational parts for semi-automatic performance of the device. These parts comprise a drinking trough 4 curved downwardly and inwardly from the face of the tank wall starting from the bottom lip of the opening 3. This trough curves upwardly to form the rear wall of a water tight receptacle 5 having side walls 6 connecting in a flanged manner with the periphery of the said opening 3. This rear wall continues upwardly to connect with the top edge of the said opening 3 in a water tight manner. Thus a completely water tight receptacle displaces the water content in part of the tank 1 by the amount of its volume. In this respect my invention differs greatly from conventional stock watering animal operated troughs.

The semi-automatic water regulating means consist of a hinged curved flap member 7 hanging from hinges 8 attached to the rear wall of the receptacle 5 and on the exposed front face of same. The position of this flap is such as to be readily approached and struck by the animal requiring to drink at the front open wall of the water tank 1. The bottom troughed portion of the flap 7 is perforated with apertures 9 to permit the passage of water for drinking purposes. A valve 10 is so disposed in the rear wall of the receptacle 5 as to be conveniently contacted by the flap 7. This valve comprises a stem 11 which has slidable ribs 12 axially parallel on its surface, said ribs slidably contacting the tubular guide nipple 13, leaving passageways 14 between the stem and the said guide 13 for the passage of water into the trough from the tank 1. On the intake end of the valve within the tank is a composition valve member 15 resting in its closed position on a valve seat 16 embodied in the guide 13. A shielding chamber 17 covers this inside end of the valve 10, the underside 17a of which chamber is open to the intake flow of water from the tank, excepting only a perforated plate 18 covering said opening to act as a strainer. This valve would normally remain closed to the outflow of water under hydrostatic head pressure of the water in the tank until such time as the projecting end 19 of the valve stem 11 is pressed in. A counterbalance weight 20 is hingedly operable within the said chamber 17 being supported on a bracket member 21, which bracket is pivoted by means of a pin 22 on a bracket 23 affixed to the wall of the said chamber. The perpendicular leg of the said bracket 21 contacts the valve member 15, and together with the weight 20 counteracts the weight of the flap member 7 pressing against the outer end 19 of the valve stem 11. The guide member 13 is screwed into and through a lug 24 to pass through the rear wall of the trough 5. A nut 25 is formed on the guide nipple 13 for this screwing purpose. The weight 20 is slidably adjustable in its relationship to the bracket 21 by means of a slot 26 in said bracket and a bolt and lock nut 26a screwably affixed to the weight 20. This adjustment is for the variation that must be allowed for in water pressure and the weight of the flap.

It has been demonstrated that an animal requiring water will instinctively push the flap 7, and in this semi-automatic manner will fill the drinking trough 5 with water.

In order to accommodate other kinds of animals and their individual instincts, such as a calf, an additional flap 27 is pivotally supported on brackets 28 affixed to the side walls 6 of the receptacle 5. Any connvenient method may be employed for maintaining this flap in its inoperative position. A distance ring 29 is attached to the underside of this flap 27 for contact with the flap 7 in order to keep the said flap 27 at its correct height for animal operation.

The strainer chamber 17 is readily unscrewable from the valve guide nipple 13 for cleaning purposes.

From the foregoing the mode of operation will be evident without further detailed description, and the advantages of having the drinking trough entirely inside the water supply tank will be apparent to avoid the mess generally found to exist around conventional drinking troughs where the water may be splashed in all directions, and actual entry of the stock into the trough obtained in their endeavor to crowd around an open trough. It will be understood that modifications in size and proportions may be resorted to without departing from the spirit and scope of the following claims which I desire to secure by Letters Patent.

I claim:

1. A stock watering device of the type described comprising in combination a drinking trough housing affixed interiorly to one apertured side of a stock watering tank, a drinking trough forming the bottom part of said housing and exposed for drinking purposes exteriorly to the said tank, counter-weighted valvular means operated by animal buffet action to control the water supply from said tank to said trough, a ribbed stem forming part of said valvular means effecting passageways for water therethrough, a curved valve-opening buffer flap hingedly supported to hang within said trough housing and resting upon the exposed end of the valve in said valvular means for operating same by animal buffet action, and a flat valve-opening buffer flap within said trough housing.

2. A stock watering device of the type described comprising in combination a drinking trough housing affixed interiorly to one apertured side of a stock watering tank, and sealed against the entrance of water from said tank except under controlled valvular means, a drinking trough forming the bottom of said housing and exposed for drinking purposes from the outside of the tank, counter-weighted valvular means operated by animal buffet action, valve-opening buffer flaps hingedly supported at different heights within said trough housing and operated by said buffet action to control said water supply valvular means, a housing chamber and strainer within said tank for said valvular means, and adjustably weighted lever means pivoted within said housing chamber to counterbalance the weight of said buffer flaps, and to assure closure of said valvular means on cessation of animal buffet action.

JOHN AMBROSE WISE.